US008051870B2

(12) United States Patent
Matsuura

(10) Patent No.: US 8,051,870 B2
(45) Date of Patent: Nov. 8, 2011

(54) PRESSURE REDUCTION PROCESS DEVICE, PRESSURE REDUCTION PROCESS METHOD, AND PRESSURE REGULATION VALVE

(75) Inventor: Hiroyuki Matsuura, Tokyo-To (JP)

(73) Assignee: Tokyo Electron Limited, Tokyo (JP)

( * ) Notice: Subject to any disclaimer, the term of this patent is extended or adjusted under 35 U.S.C. 154(b) by 907 days.

(21) Appl. No.: 10/563,208

(22) PCT Filed: Jul. 2, 2004

(86) PCT No.: PCT/JP2004/009440
§ 371 (c)(1),
(2), (4) Date: Jan. 3, 2006

(87) PCT Pub. No.: WO2005/004219
PCT Pub. Date: Jan. 13, 2005

(65) Prior Publication Data
US 2006/0162780 A1    Jul. 27, 2006

(30) Foreign Application Priority Data

Jul. 3, 2003   (JP) .................................. 2003-191225

(51) Int. Cl.
*F16K 51/02* (2006.01)
(52) U.S. Cl. ..................................... 137/15.04; 137/240
(58) Field of Classification Search .................. 137/240, 137/334, 15.04, 15.06; 251/335.3
See application file for complete search history.

(56) References Cited

U.S. PATENT DOCUMENTS

| | | | | |
|---|---|---|---|---|
| 2,254,472 A * | 9/1941 | Dahl | ............................. | 137/334 |
| 3,133,554 A * | 5/1964 | Joebken | ........................ | 137/240 |
| 4,174,728 A * | 11/1979 | Usnick et al. | ................. | 137/240 |
| 4,383,546 A * | 5/1983 | Walters, Jr. | .................... | 137/240 |
| 4,554,942 A * | 11/1985 | Williams et al. | .............. | 137/240 |
| 5,678,595 A * | 10/1997 | Iwabuchi | ....................... | 137/341 |
| 5,755,255 A | 5/1998 | Iwabuchi | | |
| 5,950,646 A | 9/1999 | Horie et al. | | |

(Continued)

FOREIGN PATENT DOCUMENTS

JP         56-105183         8/1981
(Continued)

OTHER PUBLICATIONS

Notification of Transmittal of Translation of the International Preliminary Report on Patentability (Form PCT/IB/338)—PCT/JP2004/009440, dated Jan. 2004.

(Continued)

*Primary Examiner* — Kevin Lee
(74) *Attorney, Agent, or Firm* — Smith, Gambrell & Russell, LLP

(57) ABSTRACT

The object of the present invention is to provide a low pressure processing system having no possibility of leakage at a valve provided in an exhaust passage when the valve is closed, and capable of reducing a load of maintenance work. An exhaust pipe 3 connected to a reaction tube 1 is provided therein with a gate valve 4 for hermetically closing the exhaust passage. A purge gas is jetted, from jetting ports circumferentially arranged respectively in a valve seat and a valving element of the gate valve, into a gap between the valve seat and the valving element. This prevents foreign objects originated from a process gas from adhering to those surfaces of the valve seat and the valving element that face the gap between the valve seat and valving element, improving sealing capability of the gate valve.

9 Claims, 6 Drawing Sheets

U.S. PATENT DOCUMENTS 6,123,909 A    9/2000    Yamamoto et al.

FOREIGN PATENT DOCUMENTS

| | | |
|---|---|---|
| JP | 08-285132 | 11/1996 |
| JP | 08-285133 | 11/1996 |
| JP | 09-089139 | 3/1997 |
| JP | 11-195649 | 7/1999 |
| JP | 11-214317 | 8/1999 |
| JP | 11-325313 | 11/1999 |
| TW | 453974 | 9/2001 |

OTHER PUBLICATIONS

PCT International Preliminary Report on Patentability (Form PCT/IB/373)—PCT/JP2004/009440, dated Jan. 2004.

Translation of PCT Written Opinion of the International Searching Authority—(Form PCT/ISA/237)—PCT/JP2004/009440, dated Jan. 2004.

Korean Office Action issued on Sep. 27, 2010 for KR Application No. 10-2005-7008327 w/English translation.

* cited by examiner

PRESSURE REDUCTION PROCESS DEVICE, PRESSURE REDUCTION PROCESS METHOD, AND PRESSURE REGULATION VALVE

TECHNICAL FIELD

The present invention relates to a low pressure processing system and a low pressure processing method that treat a substrate such as a semiconductor wafer (hereinafter simply referred to as "wafer") under a reduced pressure, and also relates to a pressure control valve.

BACKGROUND ART

Semiconductor device manufacturing processes includes a process that supplies a process gas into a reaction vessel to treat a substrate under a reduced pressure. An example such a process is a low pressure CVD (chemical vapor deposition) that deposits a thin film on a substrate through the reaction of film-forming gases. If a reaction product forming a thin film and reaction by-products are flown into an exhaust pipe and adhere to a gate valve (main valve) arranged in the exhaust pipe, leakage occurs in the valve when shutting off the valve. In order to avoid this, the exhaust pipe is provided with a trap on the upstream side of the valve to trap the above products. Adhesion of some specific sorts of reaction products and reaction by-products to the gate valve and the exhaust pipe can be prevented by heating them.

When a silicon oxide film ($SiO_2$ film) is formed by using TEOS (tetraethyl orthosilicate: $Si(O_2C_5H)_4$), decomposition products of non-reacted TEOS discharged from the reaction vessel adhere to the exhaust passage even if the exhaust passage is heated. In order to avoid this, a trap is arranged upstream of the gate valve.

In a CMOS (Complementary Metal Oxide Semiconductor), a silicon nitride ($Si_xN_y$) film serving as a protective layer is deposited on a silicon oxide film serving as a gate insulating film. It has been examined, for forming the above two films, that the silicon oxide film is formed in a low pressure CVD system by using TEOS, and then the silicon nitride film is formed in the same low pressure CVD system by using dichlorosilane ($SiH_2Cl_2$) gas and ammonia gas.

The process pressure for the silicon nitride film formation is low, being lower than 133 Pa (1 Torr). Thus, a trap can not be provided in the exhaust passage, because the interior of the reaction vessel can not be evacuated to a target process pressure if the trap is provided. However, if a trap is not provided, decomposition products of non-reacted TEOS discharged form the reaction vessel during the silicon oxide film formation is likely to adhere to the valve in the exhaust passage. If the valve is a gate valve having pressure-controlling function, as rise in pressure in a space between the valve body and the valve seat unavoidably occur when the opening of the valve is small, decomposition products of non-reacted TEOS is likely to adhere to the surfaces of the valving element and the valve seat and then solidify. FIG. 6 shows a state in which solid matters originated from TEOS are deposited on surfaces around an O-ring 90 and a valve seat 92, on which a valving element 91 is seated, in a valve 9. If such solid matters are deposited on surfaces in the valve 9, the valving element 91 can not come in close contact with the valve seat 92 when the valve 9 is closed. Thus, leakage check of the reaction vessel to be carried out before the process becomes impossible. Therefore, frequent maintenance (notably, cleaning) of the valve 9 is necessary, and thus the operator bears a great burden.

JP11-195649A discloses that, immediately before closing a shutoff valve arranged in a source gas passage, a purge gas such as argon gas flows into the valve through a branch passage transversely connected the source gas passage, thereby to blow off solid matters adhered to surfaces facing a space between a valve seat and a valving element. Thus, leakage and damage of the valve seat, which may occur by closing the valve while solid matters are interposed between the valve seat and the valving element, can be prevented.

However, even if the purge gas is jetted to the valve in the source gas passage immediately before the valve is closed, only parts of the contact surfaces of the valve seat and the valving element are exposed to the purge gas having a velocity high enough to remove the solid matters. Moreover, if solid matters having high adhesion are adhered, a high removing effect can not be achieved.

SUMMARY OF THE INVENTION

The present invention has been made under the aforementioned circumstances, and the object of the present invention is to provide a low pressure processing system, a low pressure processing method, and a pressure control valve, which prevent leakage in a valve provided in an exhaust passage when the valve is closed, and are capable of reducing a load of maintenance work.

The present invention provides a low pressure processing system including an exhaust passage connected to a reaction vessel, and a gate valve that hermetically closes the exhaust passage by pressing a valving element against a valve seat to contact the same, said apparatus being adapted to process a substrate contained in the reaction vessel by a predetermined treatment by supplying a process gas into an interior of the reaction vessel while maintaining an atmosphere of a reduced pressure in the interior of the reaction vessel by evacuating the same through the exhaust passage, said apparatus further including: at least one purge gas supply port opening into a gap between the valving element and the valve seat; and a purge gas supply passage through which a purge gas is supplied to the purge gas supply port.

According to the present invention, as the purge gas is jetted into the gap between the valving element and the valve seat, deposition of reaction products to surfaces, facing the gap, of the valving element and the valve body. The term "reaction product" herein means not only a reaction product which is the same as that deposited on the substrate but also a reaction by-product.

Preferably, the low pressure processing system further includes a purge gas valve arranged in the purge gas supply passage to supply and stop supplying the purge gas, and a controller configured to control the valve so that the valve is opened to supply the purge gas when the interior of the reaction vessel is supplied with the process gas. Thus, as the purge gas is jetted when the process gas is supplied, deposition of the reaction products near the gap can be securely prevented.

In one embodiment of the present invention, the valve seat has a ring shape, and a plurality of purge gas supply port arranged circumferentially are provided as said at least one purge gas supply port. If the gate valve is used for controlling pressure in the reaction vessel by adjusting the size of the gap between the valving element and the valve seat, the present invention is very effective for preventing deposition of the reaction products under the condition where the opening of the valve is small and thus the reaction product is likely to be deposited. In addition, the present invention is specifically effective in a case where the process gas used in the low pressure process is such that reaction products of the process gases are unavoidably deposited on an inner surface of the exhaust passage even if the exhaust passage is heated, for example, in a case where the process gas is made by vaporizing a liquid source.

It should be noted that the gate valve itself, constituting the low pressure processing system, is advantageous if it is used as a pressure control valve.

The present invention further provides a low pressure processing method of performing a low pressure process by using a low pressure processing system including an exhaust passage connected to a reaction vessel, and a gate valve that hermetically closes the exhaust passage by pressing a valving element against a valve seat to contact the same. The method includes a step of supplying a process gas into an interior of the reaction vessel while maintaining an atmosphere of a reduced pressure in the interior of the reaction vessel by evacuating the same through the exhaust passage, thereby processing a substrate contained in the reaction vessel by a predetermined treatment; and a step of supplying a purge gas, from at least one purge gas supply port opening into a gap between the valving element and the valve seat of the gate valve, into the gap. In one preferred embodiment, the step of supplying of the purge gas to the gap includes: a step of supplying the purge gas from a first gas supply port along a face, to be in contact with the valving element, of the valve seat; and a step of supplying the purge gas from a second gas supply port along a face, to be in contact with the valve seat, of the valving element.

BEST MODE FOR CARRYING OUT THE INVENTION

Figure 1:
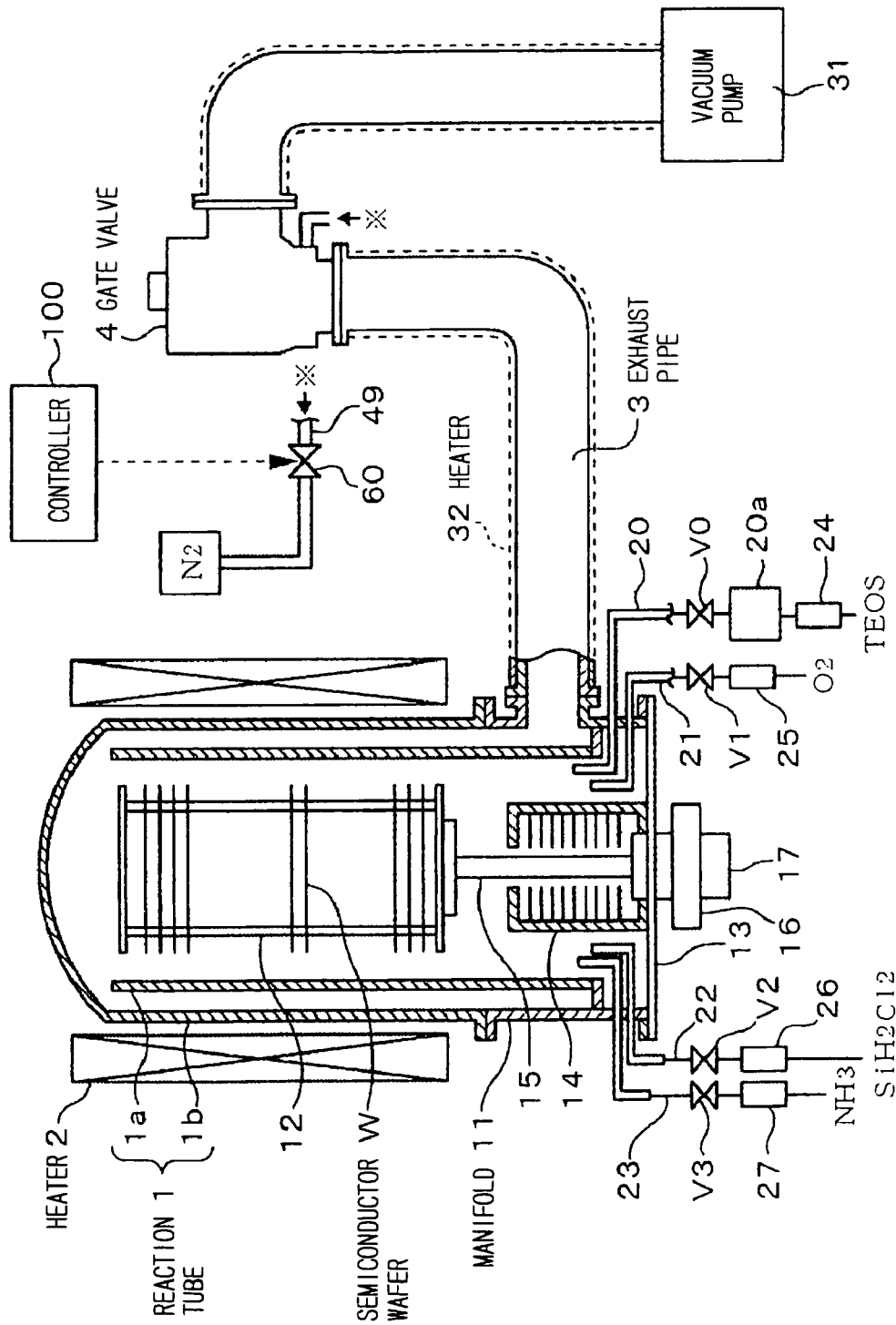
FIG. 1 is a partial cross-sectional view showing the structure of a low pressure CVD system in one embodiment of the present invention.

A low pressure CVD system as one embodiment of a low pressure processing system according to the present invention will be described with reference to the attached drawings. Although the essential part of this embodiment is a gate valve, which is a pressure control valve, arranged in an exhaust passage, the description starts with a brief explanation of parts relating to a reaction vessel for processing substrates therein, with reference to FIG. 1. In FIG. 1, reference numeral 1 denotes a reaction tube of a double tube structure composed of an inner tube 1a and an outer tube 1b. A cylindrical manifold 11 formed of a metal such as a stainless steel is arranged below the reaction tube 1. The upper end of the inner tube 1a is opened, while the lower end of the inner tube 1a is supported by a support member arranged on an inner circumference of the manifold 11. The upper end of the outer tube 1b is closed, while the lower end of the outer tube 1b is hermetically connected to the upper end of the manifold 11. In this embodiment, a reaction vessel is constituted by the reaction tube 1 and the manifold 11.

FIG. 1 shows a state where wafers W, i.e., process objects, loaded into the reaction tube 1 are subjected to a film-forming process. In the reaction tube 1, plural pieces of wafers W are horizontally supported by a quartz wafer boat 12, i.e., a substrate holding device, at vertical intervals in a tier-like manner. The wafer boat 12 is held in place above a lid 13 while a heat insulating unit 14 is arranged between the wafer boat 12 and the lid 13. The heat insulating unit 14 has a heat-insulating structure with plural quartz fins. A rotation shaft 15 passes through the center of the heat insulating unit 14. The rotation shaft 15 is rotated by a drive unit 17 arranged in the boat elevator 16, thereby the wafer boat 12 rotates. The lid 13 is mounted on the boat elevator 16 provided for loading and unloading the wafer boat 12 into and from the reaction tube 1. The lid 13 closes a lower end opening of the manifold 11 when the lid 13 is in its uppermost position.

A heater 2, i.e., heating means, made of resistance heating elements is arranged around the reaction tube 1 to surround the same. A furnace main body, not shown, is arranged around the heater 2. First to fourth film-forming gas supply pipes 20-24 are arranged near the reaction tube 1 to supply film-forming gases, i.e., process gases, into the inner tube 1b. The first film-forming gas supply pipe 20 is provided for supplying TEOS, and is provided therein with a vaporizer 20a for vaporizing TEOS which is a liquid source. The second film-forming gas supply pipe 21 is provided for supplying oxygen ($O_2$) gas. The third and fourth film-forming gas supply pipes 22 and 23 are provided for supplying dichlorosilane ($SiH_2Cl_2$) gas and ammonia ($NH_3$) gas, respectively. The supply pipes 20-23 are connected to respective gas sources, not shown. The reference signs V0-V3 denote valves for supplying and stopping supplying respective gases. The reference numerals 23-26 denote mass-flow controllers for adjusting gas flow rates.

Connected to the manifold 11 is an exhaust pipe 3 made of a metal such as a stainless steel, which pipe serves as an exhaust passage for discharging an atmosphere in the reaction vessel from a space between the inner tuber 1a and the outer tube 1b. A vacuum pump 31, i.e., evacuating means, is connected to the exhaust pipe 3. A heater 32, i.e., heating means for heating the exhaust pipe 3, is arranged on the exhaust pipe 3. In the illustrated embodiment, the heater 32 is a tape heater wound around the exhaust pipe 3. A gate vale 4 having a pressure-controlling function is provided in the exhaust pipe 3. The interior of the outer tube 1b and the vacuum pump 31 are connected and disconnected by opening and closing the gate valve 4. The pressure in the reaction vessel can be controlled by adjusting the opening the gate valve 4.

Reference numeral 100 denotes a controller which controls the operations of the entire low pressure CVD system. The controller 100 is also capable of controlling the supply of a purge gas through open-close control of the valve 60 (purge gas valve), described later.

Next, the gate valve 4 is described with reference to FIGS. 2 and 3. The gate valve 4 is mainly composed of a main body (valve casing) having a substantially cylindrical shape, and a valving element 41 having a substantially cylindrical shape accommodated in the main body 40. The flow of a gas flown into the gate valve 4 from the reaction-vessel side is controlled by moving the valving element 41 with respect to the main body 40 in the axial direction (vertical direction in the drawing), thereby the pressure in the reaction vessel can be controlled. A hollow, cylindrical cover 4a is attached to an upper portion of the main body 40. A gas cylinder actuator 4b is accommodated in the cover 4a.

A shaft 4d is arranged at the lower portion of the gas cylinder actuator 4b. An upper portion of the shaft 4d is inserted into the gas cylinder actuator 4b, while a lower portion of the shaft 4d is fixed to the valving element 41 in the valving element 41. The shaft 4d moves vertically by operating the gas cylinder actuator 4b, thereby the valving element 41 can be moved vertically. A gas port 4c is provided at a lower portion of the gate valve 4 to supply nitrogen gas, as a purge gas, into the gate valve 4 from outside the gate valve 4. The nitrogen gas, which is a purge gas, supplied from the gas port 4c is supplied into the valving element 41. FIG. 2 shows a state in which the valving element 41 rises to open the gate valve 4; and FIG. 3 shows a state in which the valving element 41 lowers to close the gate valve 4.

Figure 2:
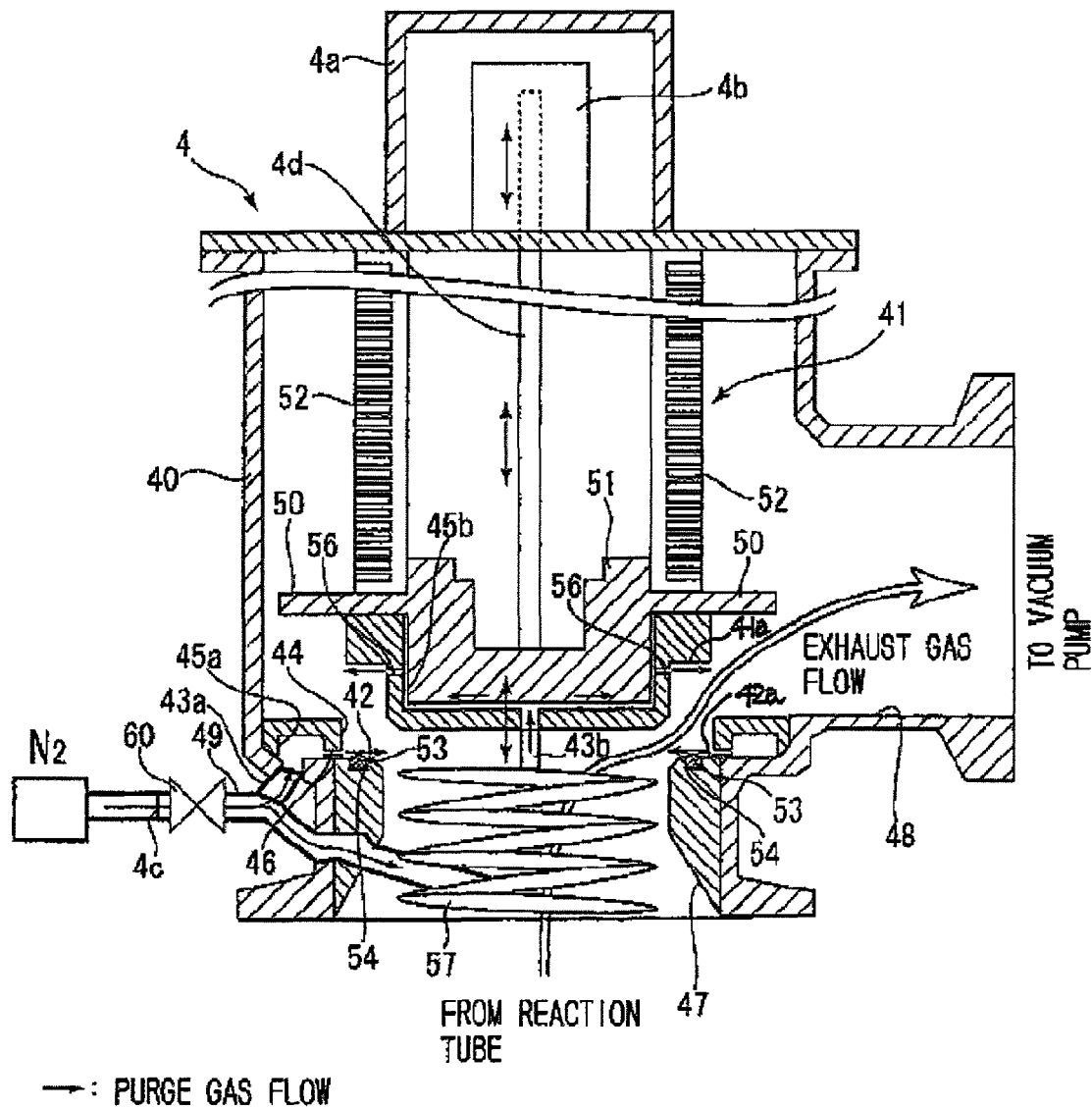
FIG. 2 is a vertical cross-sectional view of a gate valve in a first embodiment of the present invention.
Figure 3:
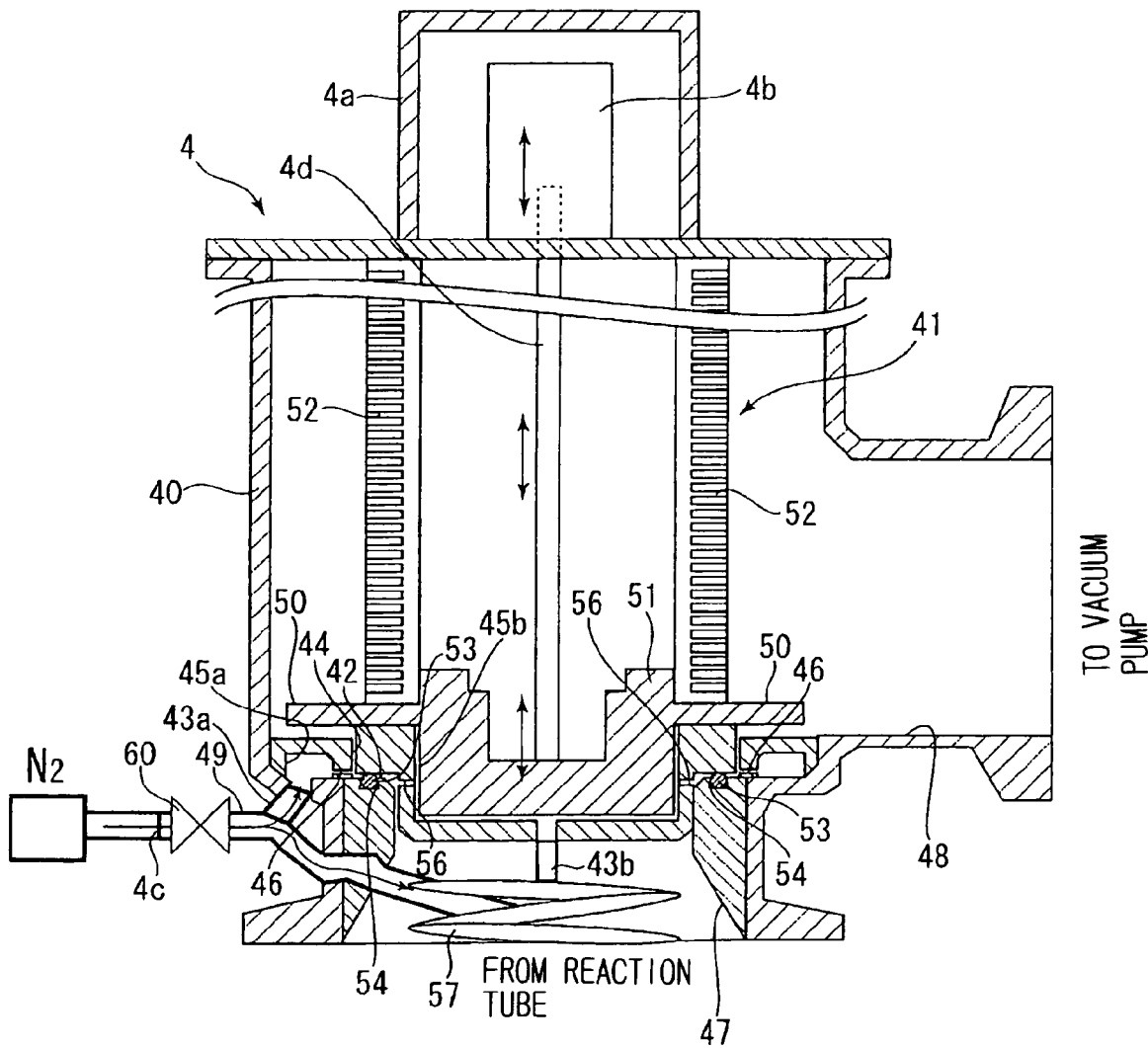
FIG. 3 is a vertical cross-sectional view of the gate valve shown in FIG. 2 in a closed state.

FIGS. 2 and 3 are partial cross-sectional views of the gate valve 4 in the first embodiment. A valve seat 42 having an annular surface 42a is formed in the main body 40. A lower annular surface 41a of a peripheral portion of the valving element 41 comes into contact with the valve seat 42. The main body 40 is provided with a gas supply passage 43a to supply a purge gas such as nitrogen gas. A ring-shaped member, which has a vertical wall 44 extending upward from a peripheral portion of the valve seat 42, is arranged to surround the valving element 41. The ring-shaped member is internally provided with a gas communication chamber 45 having a ring shape. The gas supply passage 43c is connected to the gas communication chamber 45. Plural jetting ports 46, i.e., first purge gas supply ports, are formed in the vertical wall 44, and are arranged along the whole circumference of the vertical wall 44 at angular intervals, to jet a purge gas radially inwardly from the gas communication chamber 45. That is, the plural jetting ports 46 open towards a gap between the valve seat 42 and the valving element 41, and thus the purge gas always covers the surface of the valve seat 42 when the purge gas is jetted. An inflow-side exhaust passage 47, into which an exhaust gas discharged from the reaction vessel flows, is formed in a bottom portion of the main body 40.

In a central portion of the gate valve with respect to the vertical direction, an exhaust port 48 opens toward the right side of FIG. 2, to discharge the exhaust gas inflowing through the inflow-side exhaust passage 47. Thus, the exhaust gas is flown into the gate valve 4 through the inflow-side exhaust passage 47 shown in the lower portion of FIG. 2, and outflows through the exhaust port 48 toward the right side.

A gas introducing passage 49 is connected to the upstream end of the gas supply passage 43a to supply a purge gas into the gas supply passage 43a. In this embodiment, the first purge gas passage is composed of the gas introducing passage 49, the gas supply passage 43a and the gas communicating chamber 45.

A circular recess 54 is formed in the valve seat 42. An O-ring 53 having a circular cross section is fitted in the recess while an upper portion of the O-ring is exposed to a space outside the recess 54. The O-ring 53 seals a gap between the main body 40 and the valving element 41 by closely contacting to the lower surface of the peripheral portion of the valving element 41. The purge gas jetted from the jetting ports 46 securely covers a portion of the O-ring 53 exposed to the space outside the recess 54.

The valving element 41 is provided at a lower portion thereof with a valve cap 51, which has a flange 50 having an outer diameter somewhat smaller than an inner diameter of the main body 40. A bellows 52 is arranged on an upper portion of the main body 40 while allowing vertical movement of the valve cap 51. The shaft 4d is fixed to the center of an upper portion of the valve cap 51. Thus, when the air cylinder actuator 4b is operated, the shaft 4d moves vertically, the valve cap 51 thus moves vertically, and the bellows 52 on the valve cap 51 expands and contracts. The end of the bellows 52 is in close contact with the valve cap 51 without leaving any gap therebetween, and thus the exhaust gas flown into the gate valve 4 does not flown into the interior of the bellows 52.

The valve cap 51 is provided with a gas supply passage 43b, which is separated from the gas supply passage 43a of the main body 40. The distal end of the gas supply passage 43b is connected to a circular, gas communication chamber 45b provided in the valve cap 51. Plural jetting ports 56, i.e., second purge gas supply ports, are formed in the valve cap 51, and are arranged along the whole circumference of the valve cap 51 at angular intervals. Thus, the purge gas jetted from the jetting ports 56 covers a space below the flange 50, notably, a surface, to be in contact with the valve seat 42, of the valve cap 51.

A gas introducing passage 57 in a form of a spiral is arranged in the inflow-side exhaust passage 47 at a lower portion of the gate valve 4, to supply a purge gas into the gas supply passage 43b. As the gas introducing passage 57 has a spiral shape, it can expand and contract according to the vertical movement of the valving element 41. The gas introducing passage 57 is connected to the gas port 4c. Nitrogen gas flows into the gas introducing passage 57 through the gas port 4c. In this embodiment, the second purge gas supply passage is composed of the gas introducing passage 57, the gas supply passage 43b and the gas communication chamber 45b.

As shown in FIG. 1, the gas introducing passage 49 is provided with a valve 60. When a film-forming gas is supplied into the reaction vessel (in this embodiment, when TEOS and oxygen gas is supplied, and when dichlorosilane gas and ammonia gas is supplied), the controller 100 opens the valve 60 so that nitrogen gas, which is a purge gas, is flown into the gate valve 4.

Next, the operation of the low pressure CVD system is described. First, a predetermined number of wafers (substrates) are held by the wafer boat 12 in a tier-like manner. Then, the boat elevator 17 is elevated to load the wafer boat 12 holding the wafers into the reaction vessel composed of the reaction tube 1 and the manifold 11, and to close the lower end opening of the manifold 11 (i.e., furnace throat) by the lid 13. Then, the gate valve 4 is opened, and the interior of the reaction vessel is evacuated by means of the vacuum pump 5. The gate valve 4 is closed when the pressure in the reaction vessel is lowered to a predetermined pressure such as about 0.1 Pa, and leakage check is performed by determining whether or not pressure rise in the reaction vessel occurs. The rise in pressure means that the interior of the reaction vessel is not a hermetically closed space. If a film-formation process is carried out under such a condition, air is flown into the reaction vessel, and thus a desired film thickness can not be achieved.

Then, after the interior of the reaction vessel is heated up to a predetermined temperature such as 650° C., TEOS and oxygen gas are supplied into the reaction vessel through the first and second film-forming gas supply pipes 20 and 21, respectively, and the pressure in the reaction vessel is adjusted to 100 Pa, for example, by adjusting the opening of the gate valve 4. Under such process conditions, TEOS and oxygen gas react with each other so that a silicon oxide film is formed on each wafer W.

The operation of the gate valve 4 is described. When the reaction vessel is opened or when leakage check is carried out, the gate valve 4 is in closed state, in which the valve cap 51 is pressed against the valve seat 42 so that the gap therebetween is sealed in an airtight fashion, as shown in FIG. 3. In this state, the valve 60 is closed, and thus a purge gas is not supplied into the gate valve 4.

When the film-forming process is being carried out, the gate valve 4 is opened at a predetermined opening, so that a purge gas (in this embodiment, nitrogen gas) is supplied into the gate valve 4. That is, the valving element 41 is moved upward according to a command sent from the controller 100, so that the valve cap 51 is removed from the O-ring 53 arranged on the valve seat 42. Gases discharged from the reaction vessel is flown into the gate valve 4 through the inflow-side exhaust passage 47 shown in the bottom portion of FIG. 2, and flows toward the exhaust port 48. When the pressure in the reaction vessel is controlled by adjusting the opening of the gate valve 4, the gap between the valve seat 42 and the valve cap 51 is narrow (e.g., 0.2 mm). Exhaust gas pressure rises at a location near the O-ring 53 on the valve seat 42 of the main body 40 and a location near the valving element 41 where the path of the exhaust gas is narrow, and thus deposition of reaction by-products is more likely to occur at these locations than other locations in the gate valve 4.

The valve 60 is opened to jet a purge gas from the jetting ports (first gas supply ports) 46 along the surface 42a of the valve seat 42 (an annular surface to be in contact with the valving element 41), and to jet a purge gas from the jetting ports (second gas supply ports) 56 along an annular surface 41a of the valving element 41 to be in contact with the valve seat 42. As the exhaust port 48 is sucked by the vacuum pump 31, the purge gas is jetted toward the gap between the valve cap 51 of the valving element 41 and the valve seat 42 at a high speed close to the sound speed. As a result, deposition of reaction by-products or the like on portions, near the O-ring 53 on the valve seat 42, of the main body 40, and portions near the valving element 41 can be prevented. Thus, close contact between the valve seat 42 and the valve cap 51 of the gate valve 4 via the O-ring 53 is assured.

After completion of the silicon oxide film formation, nitrogen gas is supplied through a gas supply pipe (not shown) into the reaction vessel to purge the same, and then the reaction vessel is fully evacuated by the vacuum pump 31. Then, the silicon nitride film formation is carried out. First, the interior of the reaction vessel is heated up to a predetermined process temperature in the range of 500 to 800° C. Thereafter, dichlorosilane gas and ammonia gas are supplied into the reaction vessel through the second and third film-forming gas supply pipes 22 and 23, respectively, while the pressure in the reaction vessel is controlled at a pressure below 133 Pa (1 Torr) such as 66.5 Pa by means of the gate valve 4, thereby to form a silicon nitride film on each wafer W. At this time, ammonium chloride, which is a reaction by-product, is generated, and is discharged from the reaction vessel. However, as the interior of the exhaust pipe 3 is heated at a temperature higher than the sublimation temperature of ammonium chloride, it is discharged through the exhaust pipe 3 without being deposited thereon. A purge gas is also supplied into the gate valve 4 in the aforementioned manner during the silicon nitride film-forming process, and thus deposition of the reaction by-products on the contact surfaces of the valve cap 51 and valve seat 42 can be prevented.

After the completion of the series of processes, a purge gas is supplied through the not-show gas supply pipe into the reaction vessel to purge the same. Then, the boat elevator 17 is lowered to unload the wafer boat 12.

In the aforementioned embodiment of the present invention, a purge gas is jetted from the first purge gas supply port along the surface, to be in contact with the valving element 41, of the valve seat 42, and a purge gas is jetted from the second purge gas supply port along the surface, to be in contact with the valve seat 42, of the valving element 41, during the time period in which the film-forming processes are being carried out while the processing gases are supplied into the reaction vessel. Thus, reaction by-products are not deposited on the surfaces of the valving element 41 and the valve seat 42 to be in contact with each other, and on the surface of the O-ring 43 interposed between the valving element 41 and the valve seat 42. Thus, the gap between the valving element 41 and the valve seat 42 can be securely sealed, and thus leakage is not occurred. As frequent maintenance (notably, cleaning) of the gate valve 4 is no longer necessary, the load of the maintenance work is reduced. The provision of a trap on the upstream side of the gate valve 4 is no longer necessary. As no trap is provided, the interior of the reaction vessel can be evacuated to a predetermined process pressure, when a low pressure process whose process pressure is lower than 1 Torr (in the illustrated embodiment, the silicon nitride film forming process) is carried out.

Figure 4:
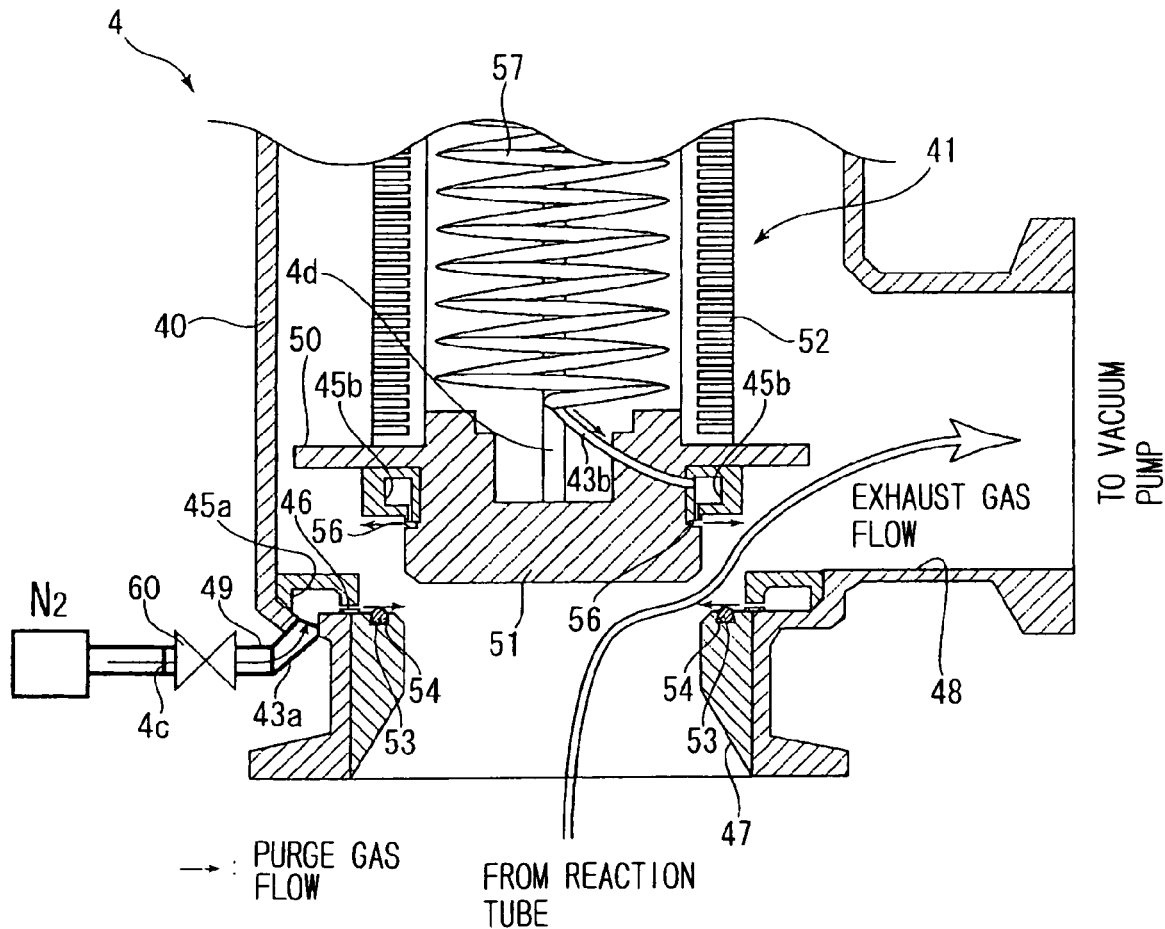
FIG. 4 is a vertical cross-sectional view of a gate valve in a second embodiment of the present invention.

FIG. 4 shows the second embodiment of the present invention. In the second embodiment, a gas supply passage 57 for the valving element 41 is arranged in the bellows 52 of the valving element 41. Due to this arrangement, as the exhaust gas does not contact the gas supply passage 57 directly, exhaust gas components and reaction by-products are not deposited on surfaces about the gas supply passage 57, and thus the workload of the maintenance of the gate valve 4 is reduced.

Figure 5:
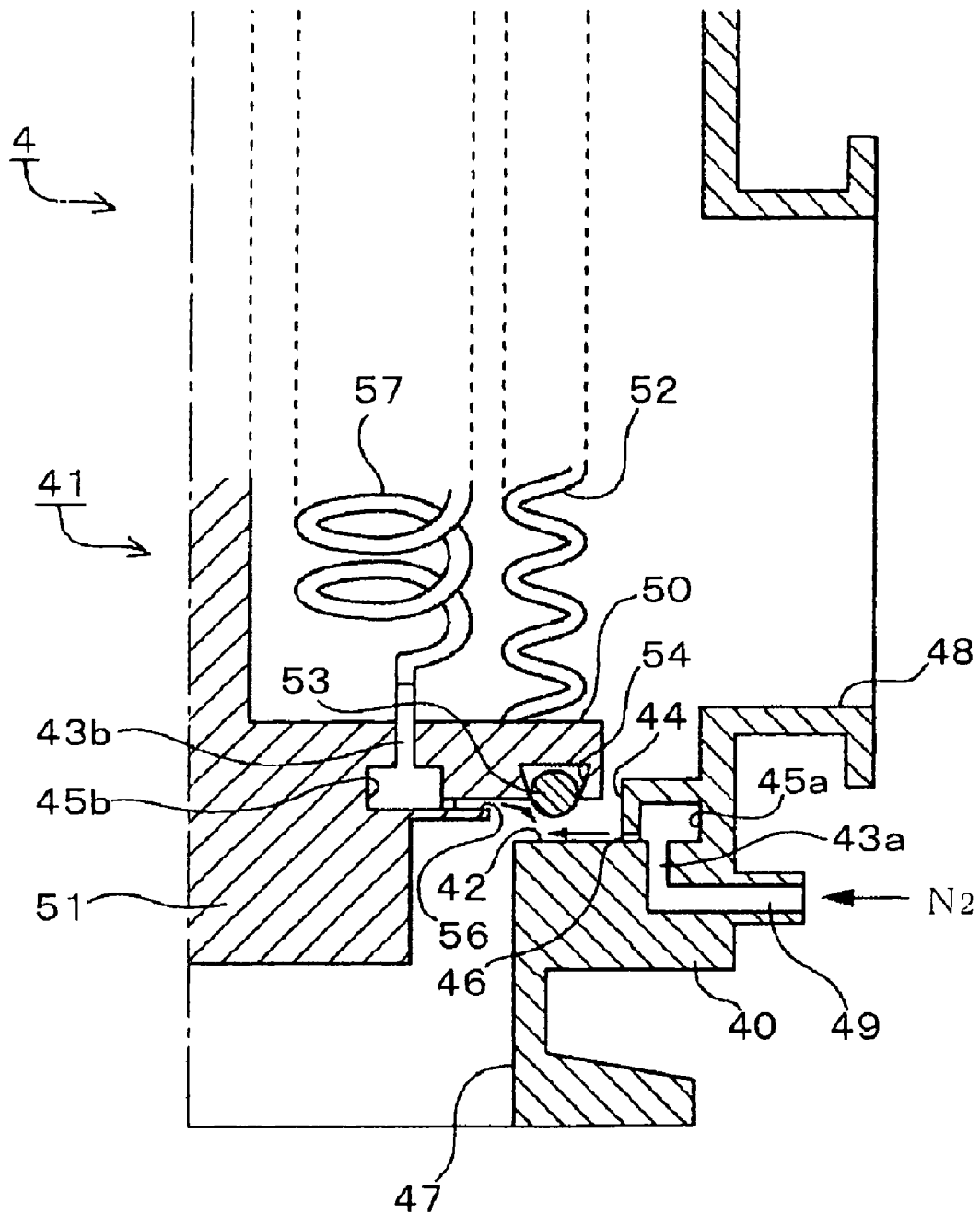
FIG. 5 is a cross-sectional view showing the detail of the essential part of a gate valve in a third embodiment of the present invention.
Figure 6:
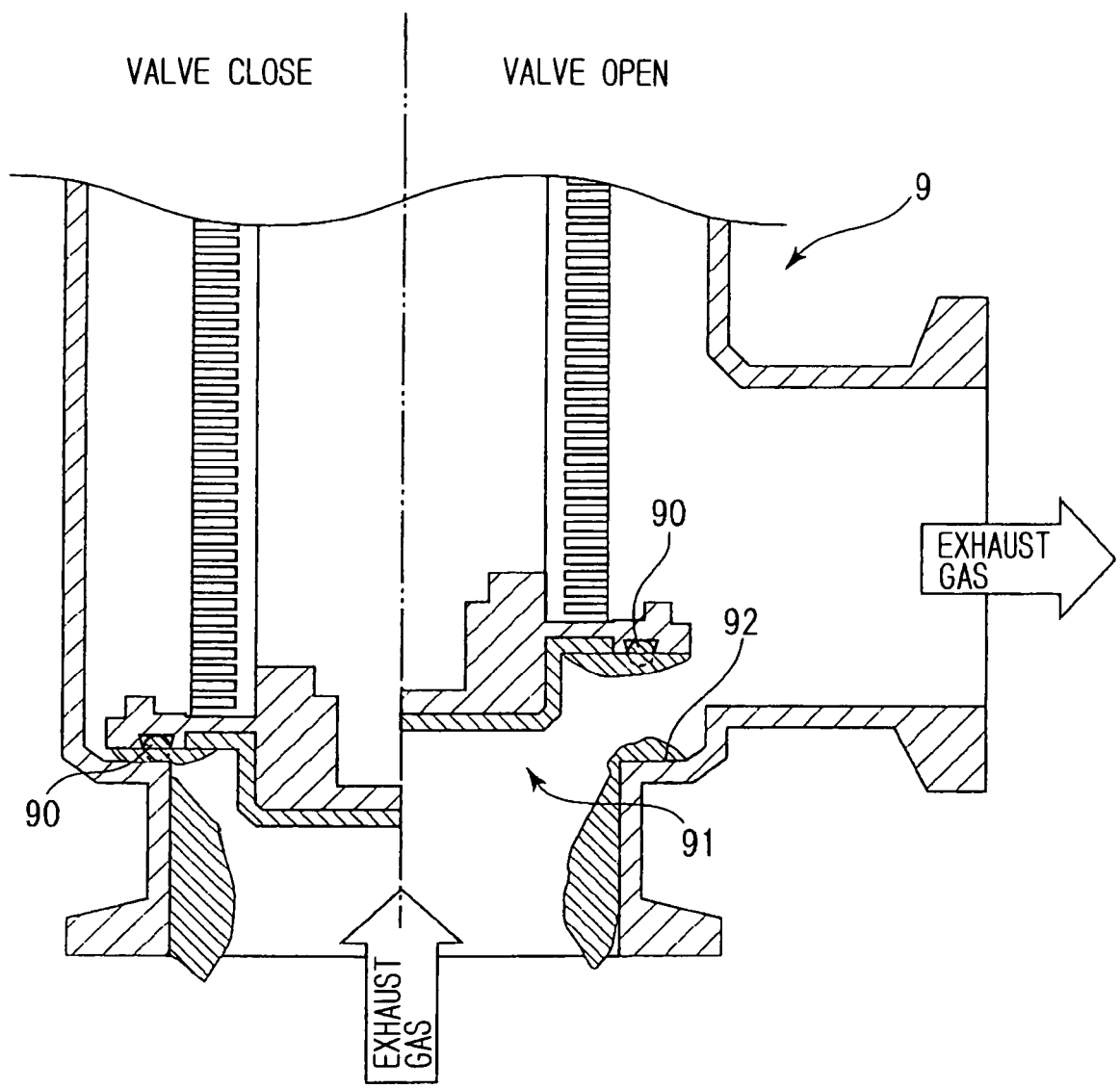
FIG. 6 is a vertical cross-sectional view showing a state in which reaction products are deposited in a conventional gate valve.

FIG. 5 shows the third embodiment of the present invention. In the third embodiment, a gas introducing passage 49 and a gas supply passage 43a are drilled through the main body 40. An O-ring 53 is arranged on the valve cap 51. As the gas introducing passage 49 and the gas supply passage 43a are drilled through the main body 40, the gas introducing passage 49 and the gas supply passage 43a are arranged in the main body, and leakage of the purge gas will not occur in the gas passages 49 and 43a, and thus the purge gas can securely be jetted in the gate valve 4.

In the above first to third embodiments of the present invention, the purge gas supply passages are provided at the valve seat 42 and the valving element 41, respectively, to supply the purge gas into the gap between the valve seat 42 and the valving element 41. However, the only one of the valve seat 42 and the valving element 41 may be provided with a purge gas supply port. In this case, the purge gas supply port preferably opens in the gap in such a manner that the purge gas flows along the surface, to be in contact with the valving element 41, of the valve seat 42, and the surface, to be in contact with the valve seat 42, of the valving element 41. The present invention is applicable not only to low pressure film-forming processes but also to a case where an etching process is performed by using an etching gas under a reduced pressure, for example. The location of the pressure control valve in the present invention is not limited to that of the illustrated gate valve 4 (in the exhaust passage), and may be in the gas supply passage through which a gas is supplied to the reaction vessel.

The O-ring 53 for enhancing the sealing performance of the gate valve 4 is arranged on the main body 40 in the first and second embodiments, and is arranged on the valving element 41 in the third embodiment. However, the O-ring 53 may be provided on either one of the main body 40 and the valving element 41, as long as the one of the main body 40 or the valving element 41 is provided with the O-ring 53.

The purge gas may be supplied throughout the time period in which the reaction vessel is being supplied with the process gas; in a part of the time period; or immediately after stopping supplying the process gas.

The invention claimed is:

1. A low pressure processing system comprising a reaction vessel, an exhaust passage connected to the reaction vessel, and a gate valve provided in the exhaust passage, said system being configured to process a substrate contained in the reaction vessel by a predetermined treatment by supplying a process gas into an interior of the reaction vessel while maintaining an atmosphere of a reduced pressure in the interior of the reaction vessel by evacuating the same through the exhaust passage, wherein:

the gate valve has a valving element and a valve seat;

the valve seat has a first annular surface and the valving element has a second annular surface opposing the first annular surface, the first or second annular surface being provided thereon with a sealing member;

the gate valve hermetically closes the exhaust passage by pressing the second annular surface of the valving element against the first annular surface of the valve seat with the sealing member being interposed between the first and second annular surfaces;

the gate valve also regulates pressure in the reaction vessel by adjusting a gap between the valving element and the valve seat;

the gate valve is provided therein with a plurality of first purge gas supply ports circumferentially arrayed beside the first annular surface of the valve seat to jet a purge gas along the first annular surface of the valve seat; and the valving element is provided therein with a plurality of second purge gas supply ports circumferentially arrayed beside the second annular surface of the valving element to jet a purge gas along the second annular surface of the valving element, the low pressure processing system further comprising:

at least one purge gas valve provided to supply and stop supplying the purge gas from the first and second purge gas supply ports; and a controller configured to control the purge gas valve so that the purge gas valve is opened to supply the purge gas when the interior of the reaction vessel is supplied with the process gas.

2. The low pressure processing system according to claim 1, further comprising a process gas supply system configured to supply the process gas into the reaction vessel to perform the predetermined treatment, wherein the process gas is such that a reaction product of the process gas is unavoidably deposited on an inner surface of the exhaust passage even if the exhaust passage is heated.

3. The low pressure processing system according to claim 1, wherein the gate valve has a main body accommodating the valving element and the valve seat, the main body is provided therein with an annular communication chamber surrounding the valve seat, and the plurality of first purge gas supply ports are in communication with the annular communication chamber.

4. A low pressure processing method comprising:

providing a low pressure processing system, the system including a reaction vessel, an exhaust passage connected to the reaction vessel, a gate valve, a purge gas valve, and a controller, wherein:

the gate valve has a valving element and a valve seat;

the valve seat has a first annular surface and the valving element has a second annular surface opposing the first annular surface, the first or second annular surface being provided thereon with a sealing member;

the gate valve hermetically closes an exhaust passage by pressing the second annular surface of the valving element against the first annular surface of the valve seat with the sealing member being interposed between the first and second annular surfaces;

the gate valve also regulates pressure in the reaction vessel by adjusting a gap between the valving element and the valve seat;

the gate valve is provided therein with a plurality of first purge gas supply ports circumferentially arrayed beside the first annular surface of the valve seat to jet a purge gas along the first annular surface of the valve seat; and the valving element is provided therein with a plurality of second purge gas supply ports circumferentially arrayed beside the second annular surface of the valving element to jet a purge gas along the second annular surface of the valving element;

supplying a process gas into an interior of the reaction vessel while maintaining an atmosphere of a reduced pressure in the interior of the reaction vessel by evacuating the same through the exhaust passage, thereby processing a substrate contained in the reaction vessel by a predetermined treatment; and controlling the purge gas valve by the controller to supply the purge gas from the first and the second purge gas ports when the substrate is being processed by the predetermined treatment.

5. The low pressure processing method according to claim 4, wherein the process gas is such that a reaction product of the process gas is unavoidably deposited on an inner surface of the exhaust passage even if the exhaust passage is heated.

6. The low pressure processing method according to claim 4, wherein the gate valve has a main body accommodating the valving element and the valve seat, the main body is provided therein with an annular communication chamber surrounding the valve seat, and the plurality of first purge gas supply ports are in communication with the annular communication chamber.

7. A pressure control valve system for a low pressure processing system configured to process a substrate contained in a reaction vessel by a predetermined treatment by supplying a process gas into an interior of the reaction vessel while maintaining an atmosphere of a reduced pressure in the interior of the reaction vessel by evacuating the same through an exhaust passage, the control valve system comprising a gate valve having a valving element and a valve seat, a purge gas valve, and a controller wherein:

the valve seat of the gate valve has a first annular surface and the valving element of the gate valve has a second annular surface opposing the first annular surface, the first or second annular surface being provided thereon with a sealing member;

the gate valve hermetically closes the exhaust passage of the processing system by pressing the second annular surface of the valving element against the first annular surface of the valve seat with the sealing member being interposed between the first and second annular surfaces;

the gate valve also regulates pressure in a space connected to the gate valve by adjusting a gap between the valving element and the valve seat;

the gate valve is provided therein with a plurality of first purge gas supply ports circumferentially arrayed beside the first annular surface of the valve seat to jet a purge gas along the first annular surface of the valve seat and with a plurality of second purge gas supply ports circumferentially arrayed beside the second annular surface of the valving element to jet a purge gas along the second annular surface of the valving element;

a purge gas valve supplies and stops supply of the purge gas from the first and second purge gas supply ports; and a controller controls the purge gas valve so that the purge gas valve is opened to supply the purge gas when the interior of the reaction vessel is supplied with the process gas.

8. The pressure control valve according to claim 7, further comprising a main body accommodating the valving element and the valve seat, wherein the main body is provided therein with an annular communication chamber surrounding the valve seat, and the plurality of first purge gas supply ports are in communication with the annular communication chamber.

9. A low pressure processing system comprising a reaction vessel, an exhaust passage connected to the reaction vessel, and a gate valve provided in the exhaust passage, said system being configured to process a substrate contained in the reaction vessel by a predetermined treatment by supplying a process gas into an interior of the reaction vessel while maintaining an atmosphere of a reduced pressure in the interior of the reaction vessel by evacuating the same through the exhaust passage wherein:

the gate valve has a valving element and a valve seat;

the valve seat has a first annular surface and the valving element has a second annular surface opposing the first annular surface, the first or second annular surface being provided thereon with a sealing member;

the gate valve hermetically closes the exhaust passage by pressing the second annular surface of the valving element against the first annular surface of the valve seat with the sealing member being interposed between the first and second annular surfaces;

the gate valve also regulates pressure in the reaction vessel by adjusting a gap between the valving element and the valve seat;

the gate valve is provided therein with a plurality of first purge gas supply ports circumferentially arrayed beside the first annular surface of the valve seat to jet a purge gas along the first annular surface of the valve seat; and the valving element is provided therein with a plurality of second purge gas supply ports circumferentially arrayed beside the second annular surface of the valving element to jet a purge gas along the second annular surface of the valving element; and wherein the low pressure processing system further comprises a purge gas valve provided to supply and stop supplying the purge gas from the first and second purge gas supply ports; and a controller configured to control the purge gas valve so that the purge gas valve is opened to supply the purge gas when the interior of the reaction vessel is supplied with the process gas, the purge gas valve, the controller, the first purge gas supply ports and the second purge gas supply ports preventing deposition of reaction-by-products on the gate valve by jetting purge gas on the valve seat and the valving element of the gate valve.

* * * * *